3,090,473
MOTOR VEHICLE TRANSMISSION CONTROLS
William J. Askins, Park Ridge, Ill., assignor to The Frank
G. Hough Co., a corporation of Illinois
Filed Aug. 4, 1960, Ser. No. 47,445
10 Claims. (Cl. 192—13)

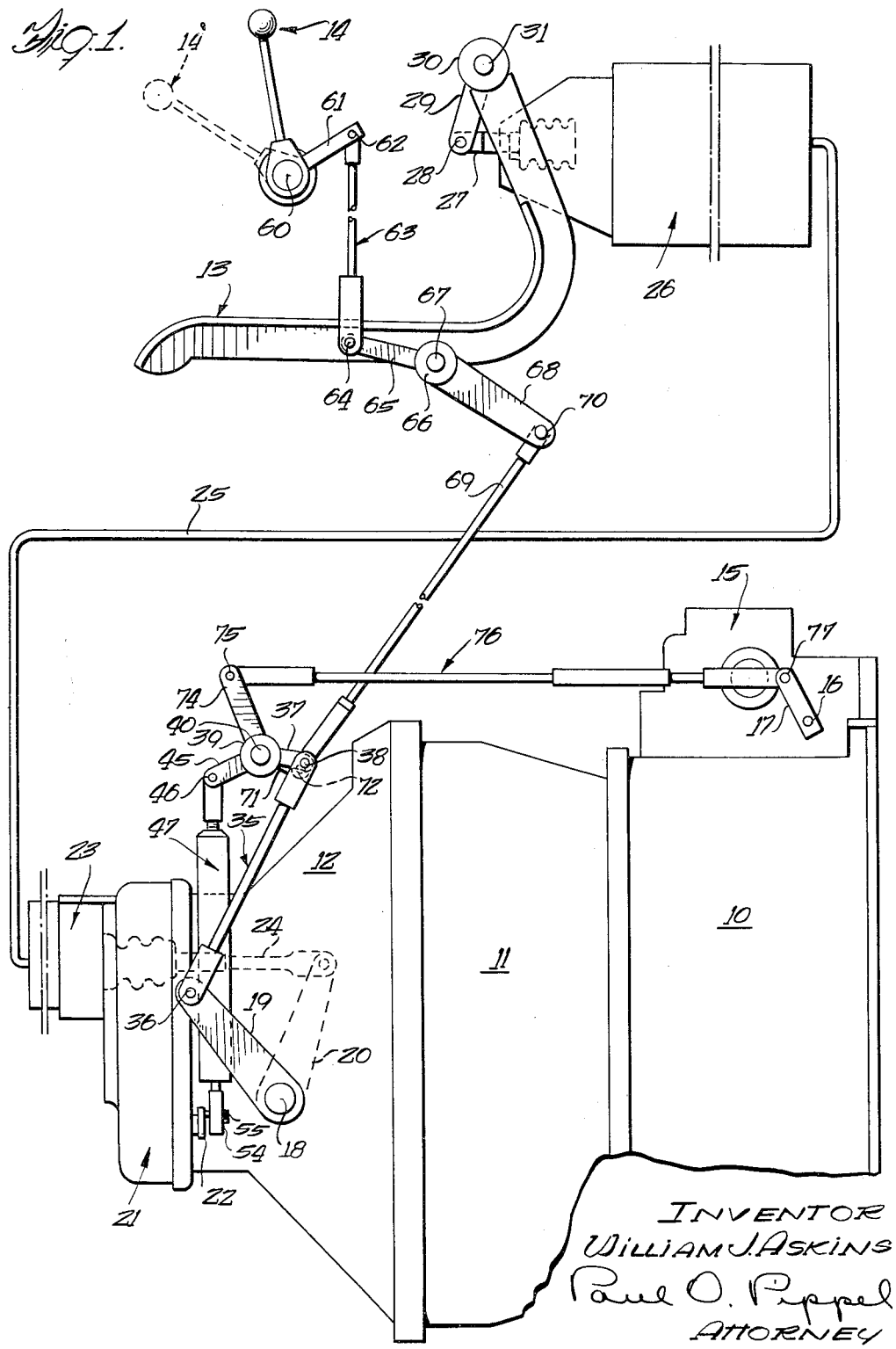

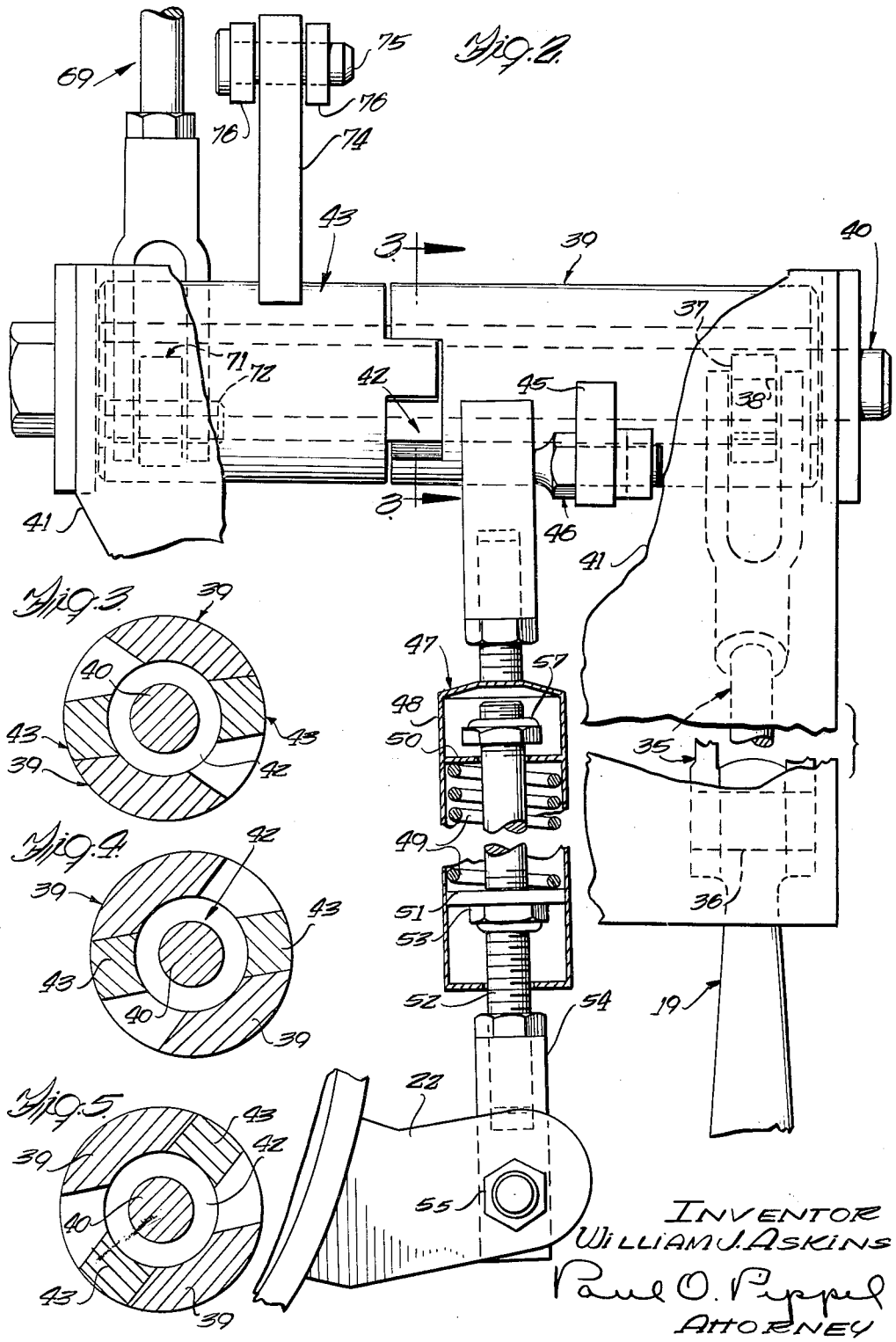

This invention relates to motor vehicle power transmission controls and more specifically to an improved co-operating controls arrangement for a master clutch and a hydraulic torque converter in a motor vehicle.

In the motor vehicle art, hydraulic torque converters are known which are adapted to be locked out or, in other words, which may be selectively adjusted to provide converter action or to provide fixed rotation of the input of the converter with the output thereof. These hydraulic torque converter arrangements are used with master clutches and gear transmissions to selectively provide the various desired speed rations for operation of the vehicle. In those instances in the operation of the vehicle wherein torque multiplication is not necessary, it is often desirable to selectively lock out the torque converter. However, when the master clutch is operated to declutch the drive from the converter to the gear transmission, it is desirable to place the converter in its converter function so that after shifting of the gear transmission and release of the master clutch to again connect drive from the converter to the gear transmission a relatively smooth reconnection of power occurs. This is accomplished with the converter in converter operation by virtue of its inherent cushioning effect on the reestablished drive to the gear transmission.

The present invention has for its object a controls arrangement for a motor vehicle having a converter, master clutch and selectively operated gear transmission, whereby the converter may be selectively placed in converter action or may be locked out and wherein means is provided for operating the master clutch, which means in operating the master clutch will so affect the converter control as to place the converter control and consequently the converter in the operated position for converter action.

It is a further object of the present invention to provide a mechanical lever and linkage arrangement between a torque converter lock out means and the control elements of a master clutch which will permit operations to selectively either provide converter action or to lock out the converter and in addition to provide that operation of the master clutch which will automatically place the converter in the operated position for converter action.

Other objects and features of the present invention will be apparent upon a perusal of the following specification and drawings of which:

FIGURE 1 is a side elevational view of portions of a motor vehicle carrying the present invention;

FIGURE 2 is an enlarged end view of a portion of the controls of the subject invention looking from the master clutch towards the converter;

FIGURE 3 is a cross-sectional view of a portion of the structure shown in FIGURE 2 and taken along the line 3—3 of FIGURE 2; and FIGURES 4 and 5 are views similar to FIGURE 3 except that the elements thereof are shown in different operated positions.

The present embodiment is the preferred embodiment but it is understood that changes can be made in the present embodiment by one skilled in the art without departing from the spirit and scope of the present invention.

For a general description of the present invention reference is made to the drawings. The hydraulic torque converter 10 has its input shaft (not shown) connected to the output shaft of an engine (not shown). The output shaft (not shown) of the converter is connected through a spacer element 11 to the master clutch 12. A foot pedal 13 in the operator's compartment of the motor vehicle is provided for operation of the master clutch. When the pedal 13 is depressed the master clutch 12 is declutched, and release of the pedal 13 causes a clutching or connection of drive through the clutch 12. The output of the master clutch 12 is connected to a suitable gear-type transmission (not shown) which requires declutching of the master clutch preparatory to shifting the transmission to a different speed ratio. A hand lever 14 is also provided in the operator's compartment of the motor vehicle, and the handle 14 may be selectively operated to two positions. In one position of the handle 14, the hydraulic torque converter is locked out and in the other position of the handle 14 the converter is placed in converter action. The subject invention which further includes various linkage and lever arrangements interconnected between the handle 14, the converter lock out device and the master clutch, provides that if the handle 14 is positioned in the position for converter lock out and the master clutch pedal 13 is depressed, the converter lock out device and the handle 14 will be moved to the position for converter action. Thus when the pedal 13 is again released after the transmission has been moved to another selected speed ratio, a relatively smooth reengagement of drive from the engine to the wheels of the vehicle will again be established. The relatively smooth reestablishment of the power train to the wheels of the vehicle is produced by the cushioning effect of the converter and is insured by the subject invention which will provide that irrespective of the operated position of the lever 14, depressing of the foot pedal 13 to operate the master clutch will place the converter 10 in converter action. After the vehicle is operating, the operator may again move the lever 14 to the converter lock out position if he so desires.

For a detailed description of the present invention, continued reference is made to the drawings. The torque converter 10 is provided with a device 15 which is operated by rotation of the shaft 16 from the position shown in FIGURE 1, which is the operated position for free wheeling of the converter or for operation of the converter in converter action, clockwise, as shown in FIGURE 1, to the second position wherein the input and output shaft of the converter 10 are locked together. The constructions of the converter 10 and the device 15 may be of any suitable types known in the art. The lever 17 is fixed to the shaft 16 for rotating the shaft 16 of the converter lock out device 15. The output shaft (not shown) of the converter 10 is connected through the spacer member 11 to the master clutch 12. The spacer member 11 serves to properly position the converter 10 and master clutch 12 relative to the engine and transmission (not shown) of the vehicle. The master clutch 12 may be of any suitable type known in the art and comprises a shaft 18 which when rotated will cause operation of the clutch to either connect the drive from the converter 10 to the output member of the master clutch 12 or to disconnect the drive from the converter 10. The shaft 18 extends at each end thereof externally of the housing of the master clutch 12, and one end of the shaft 18 is provided with a lever 19 keyed thereto and the other end of the shaft 18 on the other side of the master clutch housing is provided with the lever 20 keyed thereto. The shaft 18 and the levers 19 and 20 are shown in the position wherein the drive is declutched, in other words, drive from the converter is disconnected from the output member of the master clutch 12. The master clutch 12 further comprises a clutch brake 21 which is carried on the rearward end of the clutch housing, and which is connected to the output member of the master clutch 12. The clutch brake 21 may be of any suitable type known in the art and is operated by a lever 22. When the lever 22 is in its lowermost position the clutch brake is applied to hold the output member of the master clutch 12 stationary. The master clutch 12 is further provided with a hydraulic cylinder 23, the piston rod 24 of which is pivotally connected to the outer end of the lever 20. Since the clutch is shown in the declutched position wherein drive therethrough is disconnected, the piston rod 24 is shown in its outermost position and the cylinder 23 is under pressure. When the hydraulic fluid pressure in the cylinder 23 is released, suitable spring biasing means (not shown) will rotate the shaft 18 and levers 19 and 20, counterclockwise, as shown in FIGURE 1, to operate the clutch to the clutched position to cause connection of drive from the converter 10 to the output member of the master clutch 12 and to restore piston rod 24 of cylinder 23.

Hydraulic fluid under pressure is delivered to the head end of the cylinder 23 through the hydraulic fluid conduit 25. The other end of the conduit 25 is connected to the head end of the hydraulic fluid cylinder 26. Hydraulic fluid pressures are developed in the head end of the cylinder 26 by movement of the piston rod 27 inwardly of the cylinder 26. The outer end of the rod 26 is pivotally connected at 28 to one end of lever 29. The other end of lever 29 is secured to the sleeve 30 which is rotatably mounted on a fixed pin 31. Foot pedal 13 is also secured to the sleeve 31, and the foot pedal 31 and the lever 29 are so arranged relative to the axis of pin 31 that when the foot pedal 13 is depressed by the operator of the vehicle, the piston rod 27 is moved inwardly of the cylinder 26 to develop sufficient hydraulic fluid pressures to cause operation of the master clutch 12. Since the master clutch is shown in the declutched position, the foot pedal 13 is shown in the depressed position, and when the operator releases the foot pedal 13, the foot pedal 13 is pivoted clockwise as shown in FIGURE 1 to the normal unoperated position wherein the piston head in the cylinder 26 is moved toward the rod end of the cylinder.

The outer end of the lever 19, which was previously noted as keyed to the opposite end of the shaft 18 from the lever 20, is pivotally connected to one end of a link 35 by pin means 36. The other end of the link 35 is pivotally connected to a lever arm 37 by pin means 38. The lever arm 37 is fixed to a cylindrical member 39 and extends radially outwardly therefrom. The cylindrical member 39 is journalled on a shaft 40 which in turn is supported by bracket 41, only portions of which are shown in FIGURE 2. The bracket 41 is not shown in FIGURE 1 in order not to unnecessarily complicate the drawing. The bracket 41 may be of any suitable type known in the art and serves to fixedly carry the shaft 40 relative to the vehicle. The cylindrical member 39 is journalled on the shaft 40 by means of a bushing 42. The bushing 42 extends substantially the length of the shaft 40, and also carries a second cylindrical member 43. The inner end of the cylindrical member 39 is formed to have a pair of slots therein into which extend a pair of projections formed on the inner end of the cylindrical member 43. The cooperation between the two cylindrical members 39 and 43 will be described below.

In addition to the lever arm 37, the cylindrical member 39 carries another lever arm 45. The lever arm 45 also extends radially outwardly from the cylindrical member 39 at a position spaced from lever arm 37 and substantially on the opposite side of cylindrical member 39. The outer end of lever arm 45 is pivotally connected by pin means 46 to one end of the clutch brake operator 47. Pin means 46 is shown in FIGURE 2 and comprises a simple ball joint. Clutch brake operator 47 comprises a cylindrical housing 48 which is pivotally secured through the ball joint arrangement 46 to lever arm 45. The housing 48 carries a coiled spring 49 the upper end of which engages an annular ring which is fixedly carried in the housing 48 a spaced distance below the upper end of the housing 48. The other end of the coiled spring 49 engages an annular ring 51 which is carried on the rod 52. The rod 52 is threaded and carries a nut 53 against which the annular ring 51 is urged by the spring 49. One end of the rod 52 is secured to a member 54 which in turn is pivotally connected to the end of the clutch brake lever 22 by pivotal connecting means 55. Rod 52 extends into housing 48 through a suitable opening at the lower end thereof, and further extends through the fixed annular ring 50 in the upper portion of the housing 48. The upper end of the rod 52 is also threaded and carries a nut 57 thereon for maintaining the operator 47 together as a unit. It has previously been noted that the master clutch is shown in the drawings in a declutched position, and consequently the clutch brake operator 47 is shown in its operated or brake-on position. As also previously described, in the declutched position of the master clutch 12 the lever 19 is at the limit of its movement in the clockwise direction as shown in FIGURE 1. Thus link 35 is in its uppermost position and cylindrical member 39 is at the limit of its position in a counterclockwise direction. Therefore, lever arm 37 is in its uppermost position and lever arm 45 is in its downwardmost position. Since lever arm 45 is in its downwardmost position, it may be seen that the housing 48 is in its lowermost position. The lowering of the housing 48, as shown in FIGURE 2, causes a compression of the coiled spring 49 by means of the annular ring 50. The compressive force of the coiled spring 49 is applied to the annular ring 51, and this force in being transmitted through the nut 53 to the rod 52 causes a downward movement of the rod 52 and a downward movement of the lever arm 22 of the clutch brake to cause the clutch brake 21 to be operated to the on position, braking the output member of the master cluch 12. When the lever 19 is moved in the opposite direction, in other words, the counterclockwise direction as viewed in FIGURE 1, the lever arm 45 is moved upwardly and the force exerted on the rod 52 to operate the clutch brake 21 is removed.

Turning next to a description of the linkage and leverage elements connected to the hand lever 14, the hand lever 14 has previously been described as conveniently mounted in the operator's compartment of the motor vehicle. The hand lever 14 is rotatively carried on a shaft 60 which is fixed in the operator's compartment of the motor vehicle. The hand lever 14 is formed somewhat as a bellcrank and has a lever arm 61 connected thereto so that when the hand lever 14 is moved from the solid line position shown in FIGURE 1 to the dotted line position, the lever arm 61 is moved counterclockwise and upwardly as shown therein a corresponding amount. The outer end of the lever arm 61 is pivotally connected at 62 at one end of a link 63. The other end of the link 63 is pivotally connected at pin means 64 to the outer end of a lever arm 65. Lever arm 65 is secured to a sleeve 66 and extends radially outwardly therefrom. The sleeve 66 is journalled on a pin 67 which is fixedly carried in the motor vehicle. The sleeve 66 further carries another lever arm 68 which extends radially outwardly from the sleeve 66 in a direction substantially opposite from that of the lever arm 65. Thus it may be seen that when the lever 14 is moved from the solid line position to the dotted line position, as shown in FIGURE 1, the lever arm 61 is moved counterclockwise, the link 63 is moved upwardly, and the lever arm 68 is moved in a clockwise direction. The outer end of the lever arm 68 is pivotally connected to one end of a link 69 by pin means 70. The other end of the link 69 is pivotally connected to the outer end of lever arm 71 at pin means 72. As shown in FIGURE 1, lever arm 71 is disposed behind lever arm 37. Lever arm 71 is fixedly carried on the cylindrical member 43 and extends radially outwardly therefrom. Thus it may be seen that when the lever 14 is moved counterclockwise as shown in FIGURE 1 to the dotted line position, lever arm 71 is moved downwardly and cylindrical member 43 is moved clockwise.

Cylindrical member 43 carries a second lever arm, designated 74, which also extends radially outwardly therefrom and is disposed at slightly more than a right angle to lever arm 71. The outer end of lever arm 74 is pivotally connected by pin means 75 to one end of a link 76. The other end of the link 76 is pivotally connected at 77 to the outer end of lever arm 17, which has previously been noted as the operating lever for the converter lock out device 15. Thus it may be seen that when cylindrical member 43 is moved clockwise by operation of the hand lever 14 from the solid line to the dotted line position, lever 17 for the converter lock out device 15 is moved clockwise to operate the converter lock out device 15 to the converter lock up position.

Turning next to a description of the operation of the present invention in order that the construction thereof may be more readily understood, continued reference is made to the drawings. As may be seen in FIGURES 3, 4 and 5, the projections on the cylindrical member 43 are shown in the same position in FIGURES 3 and 4, that position corresponding to the positions shown in FIGURES 1 and 2 of the cylindrical member 43, and in FIGURE 5 the projections are shown as having been moved counterclockwise from the position of FIGURES 3 and 4. That counterclockwise movement is the opposite from the clockwise movement described relative to FIGURE 1 due to the particular viewing direction of section 3—3 taken in FIGURE 2. Beginning with the operated position of the subject invention, as shown in FIGURES 1, 2 and 3, the cylindrical member 43 is at the limit of its rotation in the clockwise direction as viewed in FIGURES 2 and 3 because of the position of the hand lever 14 and the various described levers and links connected thereto and the converter lock out device is operated to the position for converter action. The cylindrical member 39 is also shown in the limit of its clockwise movement as shown in FIGURES 2 and 3, because of the depressed position of the foot pedal 13 and the consequent operated position of the lever 20 and the levers and links connected thereto. The master clutch 12 is in the declutched position and the clutch brake 21 is in the brake-on position.

Assuming next that the foot pedal 13 is released so that under the force of suitable springs (not shown) it may return to the limit of its clockwise position in FIGURE 1, lever 20 will be pivoted counterclockwise as shown in FIGURE 1, and lever arm 37 on cylindrical member 39 will be moved in the clockwise direction as viewed in FIGURE 1 or in the counterclockwise direction as viewed in FIGURE 4 to the limit of movement in the counterclockwise direction as shown in FIGURE 4. In this operated position of the present invention the cylindrical member 43 remains in the operated position previously noted in regard to FIGURE 3, in other words, the converter lock out device 15 remains in the operated position for converter action. However, the master clutch 12 is now operated to the clutched position, and the clutch brake 21 is in the brake-off position. This operated condition of the converter will remain until the operator of the vehicle again moves lever 14, any further operations of the foot pedal 13 merely moving cylindrical member 39 from the position shown on FIGURE 4 to that shown in FIGURE 3 and back again.

Assuming next that with the foot pedal 13 released, the operator moves the hand lever 14 from the solid line position shown in FIGURE 1 to the dotted line position shown therein. With this operation of the hand lever 14, the lever arm 61 will be pivoted counterclockwise as viewed in FIGURE 1, the lever arms 65 and 68 being pivoted clockwise, the lever arms 71 and 74 being pivoted clockwise (counterclockwise as viewed in FIGURES 4 and 5) and the lever arm 17 being pivoted clockwise to operate the converter lock out device 15 to the converter locked up position. The cylindrical members 39 and 43 will then have the relative positions shown in FIGURE 5, the converter 10 being locked up between its input and output members and the master clutch being clutched with the clutch brake 21 in the brake-off position.

Assuming next that the operator of the vehicle desires to shift the transmission (not shown) to another speed ratio, the foot pedal 13 is then depressed. This operation will cause a clockwise pivotal movement of lever 20 as viewed in FIGURE 1, a clockwise movement of lever 19, a counterclockwise movement of lever 37 and cylindrical member 39 (a clockwise movement of cylindrical member 39 as viewed in FIGURES 5 and 3). This movement of the cylindrical member 39 from the position shown in FIGURE 5 in the clockwise direction to that shown in FIGURE 3, will cause the cylindrical member 43 to be rotated in a clockwise direction as viewed in FIGURES 5 and 3, from the position shown in FIGURE 5 to that shown in FIGURE 3. This movement of the cylindrical member 43 is the reverse of that described when the handle 14 was moved from the solid line position to the dotted line position and therefore it may be seen that the hand lever 14 will be automatically moved from the dotted line position shown in FIGURE 1 to the solid line position and the converter lock out device 15 will be moved to the position for converter action, that as shown in FIGURE 1. Thus when the operator of the vehicle again releases the foot pedal 13 to reengage the drive from the engine of the vehicle through the transmission, the cushioning effect of the converter will insure a relatively smooth pick up of power of the vehicle. In shifting the transmission, the operator need not be concerned about the operated position of the hand lever 14, since the declutching operation will automatically provide for converter action.

Having described the invention what is considered new and desired to be protected by Letters Patent is:

1. In a transmission control arrangement for a motor vehicle having a hydraulic torque converter and a master clutch with said converter having a device operable to one position to lock up the input and output of the converter and to another position to permit converter action of said converter, and having means for selectively clutching and declutching said master clutch, a hand lever rotatably mounted in the operator's compartment of said motor vehicle, linkage and leverage means connected between said hand lever, said master clutch and said device for selectively operating said device to said one position and to said another position, said linkage and leverage means being formed so that said device is contemporaneously operated to said another position when said master clutch is operated to the declutched condition whenever said device is operatively conditioned in said one position.

2. In a transmission control arrangement as claimed in claim 1 wherein said linkage and leverage means is further formed so that said device remains in said another position when said master clutch is released.

3. In a transmission control arrangement for a motor vehicle having a hydraulic torque converter and a master clutch with said converter having a device operable to one position to lock up the input and output of the converter and to another position to provide converter action of said converter, first means connectable to said device and selectively operable to two positions to operate said device to said one position and said another position, second means connectable to said master clutch and selectively operable to two positions to operate said master clutch to a declutched condition in one position and to a clutched condition in the other position, and means cooperating with said first and second means for automatically operating said first means from said one position to said another position when said first means is operatively conditioned in said one position and when said second means is operated to said one position to operate said master clutch to the declutched condition.

4. In a transmission control arrangement for a motor vehicle having a hydraulic torque converter and a master clutch with said converter having a device operable to one position to lock up the input and output of the converter and to another position to provide converter action of said converter, first means connectable to said device and selectively operable to two positions to operate said device to said one position and said another position, second means connectable to said master clutch and selectively operable to two positions to operate said master clutch to a declutched condition in one position and to a clutched condition in the other position, and means cooperating with said first and second means for automatically operating said first means from said one position to said another position when said first means is operatively conditioned in said one position and said second means is operated to said one position to operate said master clutch to the declutched condition, and said last-mentioned means further being formed to permit independent operation of said first means when said second means is operatively conditioned in said other position.

5. In a transmission control arrangement for a motor vehicle having a hydraulic torque converter and a master clutch with said converter having a device operable to one position to lock up the input and output of the converter and to another position to provide converter action of said converter, first means comprising a series of links and levers connected to a hand lever at one end thereof and connectable to said device at the other end thereof for selectively operating said device to said one position and to said another position, said series of links and levers being formed so that said device is operated to one position when said hand lever is positioned in one certain position and so that said device is operated to said another position when said hand lever is moved to another certain position, second means connectable to said master clutch and selectively operable to two positions to operate said master clutch to a declutched condition in one position and a clutched condition in another position, and means cooperating with said series of links and levers and said second means for automatically moving said series of links and levers from said one position of said device and said one certain position of said hand lever to said another position of said device and to said another position of said hand lever when said device is operatively conditioned in said one position and said hand lever is operatively conditioned in said one certain position and when said second means is operated to said one position to operate said master clutch to the declutched condition.

6. In a transmission control arrangement for a motor vehicle having a hydraulic torque converter and a master clutch with said converter having a device operable to one position to lock up the input and output of said converter and to another position to provide converter action of said converter, first means comprising a series of links and levers connected to a hand lever at one end thereof and connectable to said device at the other end thereof for selectively operating said device to said one position and to said another position, said series of links and levers being formed so that said device is operated to said one position when said hand lever is positioned in one certain position and so that said device is operated to said another position when said hand lever is moved to another certain position, said series of links and levers including a cylindrical member rotatably mounted on a shaft, second means connectable to said master clutch and selectively operable to two positions to operate said master clutch to a declutched condition in one position and a clutch condition in another position, said second means including a second cylindrical member rotatably mounted on said shaft adjacent said first cylindrical member, said cylindrical members further being formed and positioned so that said series of links and levers are moved to operate said device to said another position and to position said hand lever in said another certain position when said device is operatively conditioned in said one position and when said hand lever is operatively conditioned in said one certain position and when said second means is operated from said another position to said one position to operate said master clutch to a declutched condition.

7. In a transmission control arrangement for a motor vehicle having a hydraulic torque converter and a master clutch with said converter having a device having a shaft rotatable to one position to lock up the input and output of the converter and rotatable to another position to provide converter action of said converter, a second shaft fixedly carried in said motor vehicle, a first cylindrical member journalled on said second shaft, linkage means connected between said first cylindrical member and said shaft of said device for rotating said shaft of said device responsive to rotations of said first cylindrical member, a hand lever rotatably mounted in the operator's compartment of said motor vehicle, second linkage means pivotally connected between said hand lever and said first cylindrical member whereby said hand lever is operable to one position to rotate said first cylindrical member to operate said device to said one position and whereby said hand lever is movable to a second position to rotate said first cylindrical member to operate said device to said another position, means connectable to said master clutch and selectively operable to two positions to operate said master clutch to a declutched condition in one position and a clutched condition in another position, said last-mentioned means including means cooperating with said first cylindrical member and operating responsive to operation of said last-mentioned means to operate said master clutch to said one position to rotate said first cylindrical member whenever said hand lever is positioned in said one position and said device is operatively conditioned in said one position to move said hand lever to said second position and to operate said device to said another position, said means included in said last-mentioned means further being formed to avoid rotating said first cylindrical member when said hand lever is operatively conditioned in said another position and said device is operatively conditioned in said another position when said last-mentioned means is operated to said one position to operate said master clutch to a declutched condition.

8. In a transmisison control arrangement for a motor vehicle having a hydraulic torque converter and a master clutch with said converter having a device which has a shaft rotatable to one position to lock up the input and output of the converter and to another position to provide converter action of said converter, a second shaft fixedly carried in said motor vehicle, a first cylindrical member journalled on said second shaft, said first cylindrical member having a plurality of projections extending axially from one end thereof, a hand lever rotatably mounted in the operator's compartment of said motor vehicle, first linkage means connected between said hand lever and said first cylindrical member, second linkage means connected between said first cylindrical member and said shaft of said device, said first and second linkage means being formed so that when said hand lever is moved to one position said first linkage means is moved to rotate said first cylindrical member to move said second linkage means to rotate said shaft of said device to said one position, and so that when said hand lever is moved to a second position said first linkage means is moved to rotate said first cylindrical member to move said second linkage means to rotate said shaft of said device to said another position, means connectable to said master clutch and selectively operable to two positions to operate said master clutch to a declutched condition in one position and a clutched condition in the other position, a second cylindrical member rotatively carried on said second shaft adjacent said first cylindrical member, said second cylindrical member having slots formed in one end thereof in cooperation with the projections on said first cylindrical member, third linkage means connectable to said master clutch and connected to said second cylindrical member for rotating said second cylindrical member responsive to operation of said last mentioned means to one position corresponding to the clutched condiiton of said master clutch and to a second position corresponding to the declutched condition of said master clutch, said projections of said first cylindrical member and said slots of said second cylindrical member being formed so that said first cylindrical member is rotated responsive to rotation of said second cylindrical member to said second position thereof whenever said hand lever is positioned in said one position and said device is operatively conditioned in said one position.

9. In a transmission control arrangement as defined in claim 8 wherein said first, second and third linkage means and said projections on said first cylindrical member and said slots in said second cylindrical member are formed so that said second cylindrical member is rotated without rotating said first cylindrical member when said hand lever is operatively conditioned in said another position.

10. In a transmission control arrangement as claimed in claim 8 wherein said master clutch is provided with a clutch brake, lever means connected between said second cylindrical member and said clutch brake for operating said clutch brake when said means for operating said master clutch is operated to operate said master clutch to the declutched position.

References Cited in the file of this patent
UNITED STATES PATENTS
2,418,838    Huebner _____ Apr. 15, 1947